Patented Sept. 26, 1944

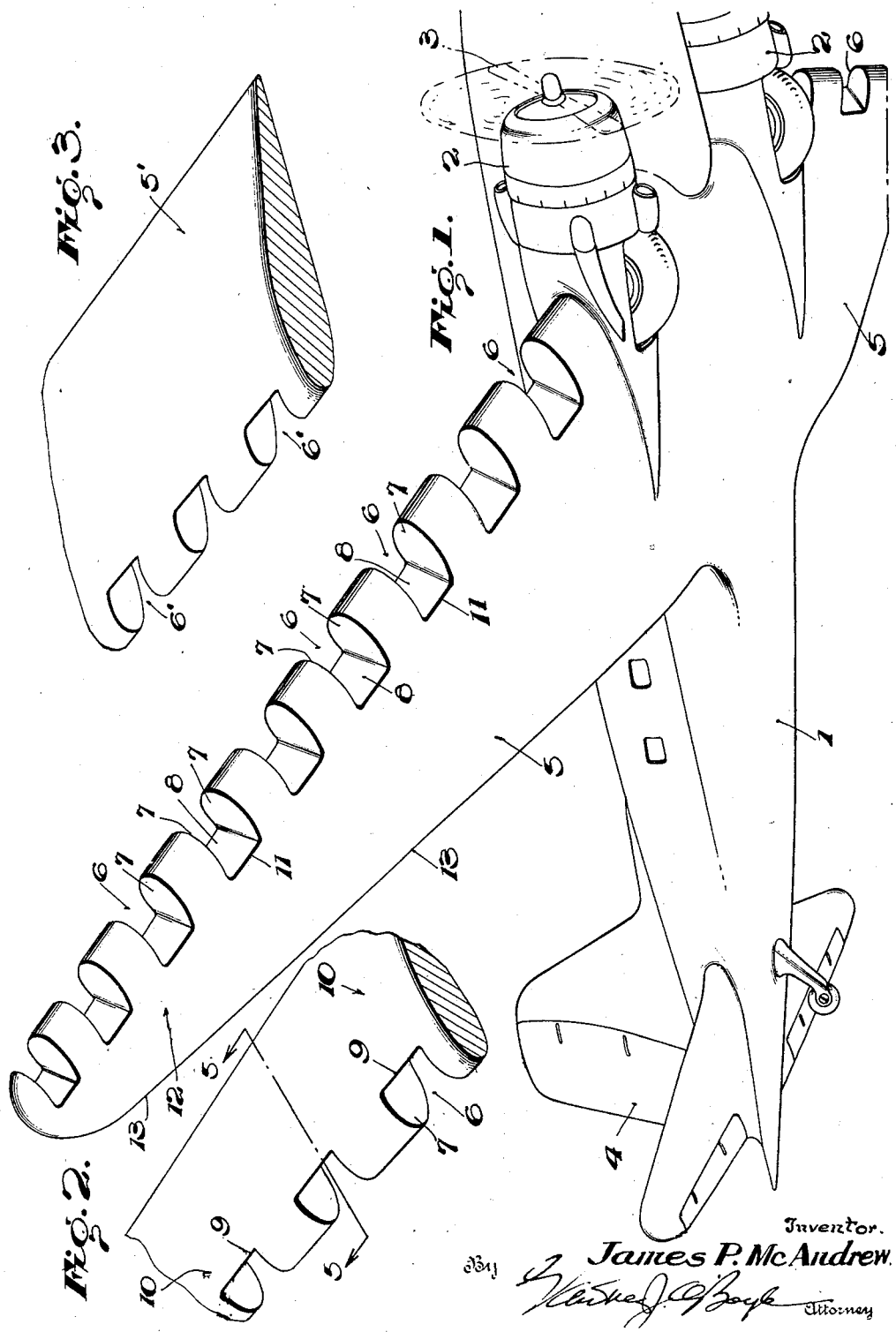

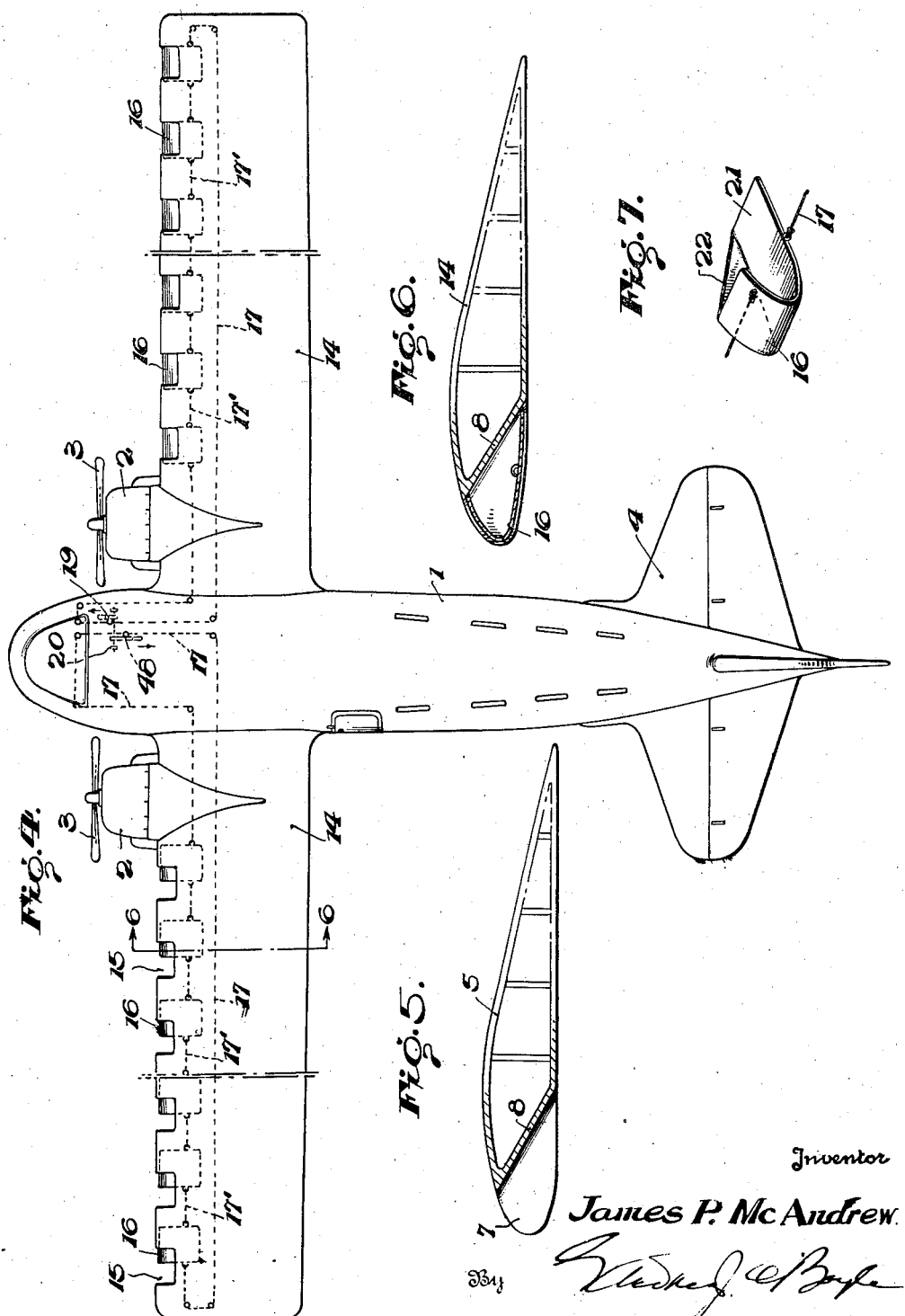

2,358,985

UNITED STATES PATENT OFFICE 2,358,985

AIRCRAFT

James P. McAndrew, Scranton, Pa.

Application February 23, 1940, Serial No. 320,477

6 Claims. (Cl. 244—40)

My invention relates to aircraft and more particularly to airplane wing structures.

Heretofore, various means have been suggested for effecting control of aircraft with the view of minimizing or preventing the aircraft from going into a spin or dive, either during take-off, landing, or in normal flight. It has been proposed to modify the leading edge of the wing tip by means of a flap and slot, or with slots, which normally form part of the wing surface, arranged to be moved outwardly to form a slot between the slat and the wing. It has been proposed also to use wing flaps in combination with suitable air passages extending through the body portion of the wing.

In prior art constructions of the character heretofore suggested, as far as I am aware, control of the aircraft is predicted upon the concept of materially increasing and maintaining the lift at high angles of attack. After considerable research and experimentation, I have found that effective control of aircraft can be obtained by providing a construction which functions in the nature of a lift spoiler, that is to say, an arrangement whereby under certain conditions of operation of the aircraft, the lift is reduced at points on the wing structure or through the areas thereof, as may be desired.

The improved structure of the present invention, whereby effective control of aircraft can be obtained, comprises essentially a wing having a discontinuous or notched leading edge. In other words, the leading edge of the airfoil is formed with cut-out portions laterally of the wing members at either side of the airplane fuselage. By reason of the location, design and arrangement of the cut-out portions or notches, with respect to the leading edge of the airfoil, improved control and stability of the aircraft is effected through the medium of lift modifications. The invention also comprehends closure means associated with the notches, either automatically operated or under the control of the pilot, so that the effective area of the individual notches can be varied.

An object of my invention is to provide a wing structure adapted to improve the stability of airplanes.

Another object of my invention is to provide improved control means for aircraft.

Yet another object of my invention is to provide an improved airplane having means associated therewith adapted to minimize or prevent the tendency to spin and also provide for quick recovery from spins.

A further object of my invention is to provide an improved aircraft having a wing structure designed to simplify control of the aircraft during flight, landing and take-off.

A still further object of my invention is to provide an improved wing structure having a discontinuous leading edge constructed and arranged whereby modification of the lift components can be effected through the desired areas of the wing.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 1 is a perspective view of the under side of an airplane equipped with the wing structure of the present invention.

Fig. 2 is a fragmental perspective view of the top of the wing shown in Fig. 1.

Fig. 3 is a fragmental perspective view of the top of a modified form of airfoil.

Fig. 4 is a top plan view of an airplane equipped with the improved wing structure, showing the arrangement of the closure means and control therefor.

Fig. 5 is a sectional view along line 5—5 of Fig. 2.

Fig. 6 is a sectional view along line 6—6 of Fig. 4, and,

Fig. 7 is a detailed perspective view of one of the closure devices.

Referring to the drawings, and more particularly to Figure 1, there is shown an aircraft comprising a fuselage 1, motors 2, propeller 3 and empennage, designated generally by numeral 4. The wing 5 is provided with a laterally discontinuous leading edge in the form of a plurality of notches or cut-out portions 6. It will be noted that the notches are equi-spaced with respect to the wing portions at either side of the fuselage and that each notch is formed with side walls 7 and a top wall 8 providing an air passage having an opening at the leading edge of the wing.

As will be seen in Figs. 1 and 2, the top walls 8 are downwardly inclined from their points of intersection 9 with the top surface 10 of the wing to their lines of intersection 11 with its under surface 12, forward of the trailing edge 13. In other words, the side walls are tapered and the top walls are downwardly inclined with respect to the chord of the airfoil, the inclination of the walls being such that they merge with the undersurface of the wing at the lines of intersection 10 therewith.

In connection with the arrangement and spacing of the notches, as here shown, they are equispaced and the area of the solid portions of the leading edge, that is, the total area of the portions which remain after the notches have been cut is substantially equal to the area which has been removed. It will be appreciated that the spacing, length, depth, and angularity and contour of the walls thereof can all be varied as may be required for different types of airfoils and design of aircraft with which the wing structure is to be associated.

Referring to Fig. 3, there is shown a perspective view of a portion of a modified form of wing structure, provided with a notched leading edge. In this form, the wing 5' is of uniform width, that is to say, it is not tapered outwardly from the fuselage to the wing tips as shown in Fig. 1. The notches 6' are equi-spaced and of uniform dimensions throughout the length of the wing.

While the notched arrangement of the leading edge per se, as above described, functions to increase the stability of aircraft generally, I have found that advantage can be taken of its inherent lift modification, by providing means to vary the effective area of the notches and in turn modify the lift components throughout desirable areas of the airfoil. This is accomplished by providing closure devices in the form of cover members adapted to be moved to open or closed position automatically or by means under control of the pilot. By means of the notched wing structure and associated closure devices, directional control of the aircraft can be effected, thus eliminating the necessity of conventional ailerons.

Referring to Fig. 4, there is shown a plan view of an airplane equipped with an improved wing structure of the present invention, together with closure or cover members associated with the notches and means to open or close the cover members. The wing 14 is provided with a plurality of cut-out portions 15 in its leading edge, to form notches similar to those of the character heretofore described. Each notch or cut-out is provided with a cover or other closure member 16, slidably mounted in the opening formed by the side and top walls of the cut-out portion. The closure members are interconnected through the medium of cables 17 or the like, whereby movement of the control member associated with the cables connecting one series of the cover members will operate to open or close the covers.

As will be seen in Fig. 4, the cover members 16 are in a partly open position. The covers are connected in series by means of short cables or other connectors 17' and when cables 17, connected to the end closures, are pulled in the proper direction, by means of control member 18, the covers are moved either to the right or left, thus opening or closing the cut-out portions. In this connection, it will be appreciated that the position of the cover with respect to the width of the opening can be varied to any desired extent. Similarly, the closure members associated with the notches in the leading edge of the wing at the right hand side of Fig. 4 may also be operated by an independent control member 19 associated with cable 17 and 17', which cables are connected with the group of covers for the wing portion at the right hand side of the figure.

Under certain conditions of operation, it may be desirable to simultaneously open or close, or move the covers to an intermediate position with respect to the cut-out portions. To enable the pilot to control the cover members simultaneously, a clutch device, designated generally by numeral 20, is provided so that the control members 18 and 19 may be operated together. It will also be understood that the improved control device of the present invention comprehends the provision of means for selectively controlling any group or series of cover members, at the will of the pilot. It will also be appreciated that the wing structure may be provided with notches or cut-out portions in the vicinity of the wing tips only, that is to say, the intermediate leading edge of the wing will be formed in the conventional manner and a series of notches provided near the ends of the wing.

Referring to Figs. 5 and 6, the relative position of the closure members with respect to the notched portion can be clearly seen. In Fig. 5, which is a sectional view along 5—5 of the wing shown in Fig. 1, the notches are open and in Fig. 6 the cover member is shown in the closed position.

Referring to Fig. 7, which is a detailed perspective view of one of the cover members, it will be noted that the cover, designated generally by numeral 16, comprises a bottom portion 21 and a side wall 22. In mounting the cover members for sliding movement in the wing, the open side of the cover, that is to say, the side defined by the front and bottom 21, is inserted in a suitable recess formed in the wing with the wall member 22 on the inside of the slot. By means of this arrangement, since the cover member is closed at the bottom and also along one side, the effective area of the slot is varied when the covers are moved from the closed position to any point intermediate thereof and the open position.

In connection with the use and operation of the closure members, it will be appreciated that in normal flight, they may be moved to the closed position to provide a leading edge of substantially the same configuration as the airfoil had originally before the cut-out portions were formed therein. In view of the fact that the notches function to modify the lift, it may be desirable under certain conditions to obtain maximum lift, and this can be readily done by closing the covers so as to present a leading edge of substantially the same configuration as a conventional airfoil.

While the exact rationale of the function of the notches, and more particularly the reaction of the various forces on the exposed surfaces of the cut-out portions with respect to the modification of the lift components, cannot be given, I believe that when the lift is decreased throughout a given area of the wing structure, as for example, when all of the cover members are in the open position, that the axis of moments shifts, with the result that the forces tending to move the forward position of the aircraft down or up as the case may be are balanced or otherwise overcome when the lift components in the given area are reduced.

In any event, and regardless of the exact mechanism of the reactive forces and resultants thereof, it has been found that the provision of a wing structure of the character herein described operates to substantially increase the stability of the aircraft with which it is associated. It has further been found that improved stability and control of the aircraft during flight is afforded by means of the closure members whereby the effective area of the notches can be varied.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. An airfoil, including leading and trailing edges, the leading edge being cut away to form a notch having side walls and a top wall, said side walls being tapered from the normal leading edge to points on the undersurface of the airfoil forward of the trailing edge, said top wall being inclined downwardly and rearwardly from the top surface of the airfoil to the under surface thereof.

2. An airfoil, including leading and trailing edges, the leading edge being cut away to form a plurality of notches laterally of said edge, each of said notches having side walls and a top wall, said side walls being tapered from the normal leading edge to points on the undersurface of the airfoil forward of the trailing edge, said top wall being inclined downwardly and rearwardly from the top surface of the airfoil to the under surface thereof.

3. An aircraft control device comprising, the combination of a wing structure having a body portion, including leading and trailing edges, the leading edge being cut away to form a plurality of notches laterally of said edge, each of said notches having side walls and a top wall, said side walls being tapered from the normal leading edge to a point on the undersurface of the wing forward of the trailing edge, said top wall being inclined downwardly and rearwardly from the top surface of the airfoil to the under surface thereof, cover members associated with the notches and means to selectively open or close certain of said cover members whereby the direction of flight of the aircraft may be changed.

4. An airfoil having leading and trailing edges, the leading edge being cut away to form a notch having side walls and a top wall, said side walls being tapered from the normal leading edge to points on the undersurface of the airfoil forward of the trailing edge, said top wall being inclined downwardly and rearwardly from the top surface of the airfoil to the under surface thereof, a cover for said notch and means to open or close said cover.

5. An airfoil having leading and trailing edges, the leading edge being cut away to form a plurality of equi-spaced notches laterally of said edge, each of said notches having side walls and a top wall, said side walls being tapered from the normal leading edge to points on the undersurface of the airfoil forward of the trailing edge, said top wall being inclined downwardly and rearwardly from the top surface of the airfoil to the under surface thereof, cover members for the notches slidably mounted on the airfoil and means to open or close said covers.

6. An aircraft control device comprising the combination of a wing structure having a body portion, including leading and trailing edges, the leading edge being cut away to form a plurality of equi-spaced notches laterally of said edge, each of said notches having side walls and a top wall, said side walls being tapered from the normal leading edge to a point on the undersurface of the wing forward of the trailing edge, said top wall being inclined downwardly and rearwardly from the top surface of the airfoil to the under surface thereof, cover members for said notches slidably mounted in the wing and means to move the cover members laterally of the notches whereby the direction of flight of the aircraft may be changed.

JAMES P. McANDREW.